Oct. 18, 1966  F. J. HOWE  3,279,895
POLYMERIZATION APPARATUS
Filed Jan. 14, 1964
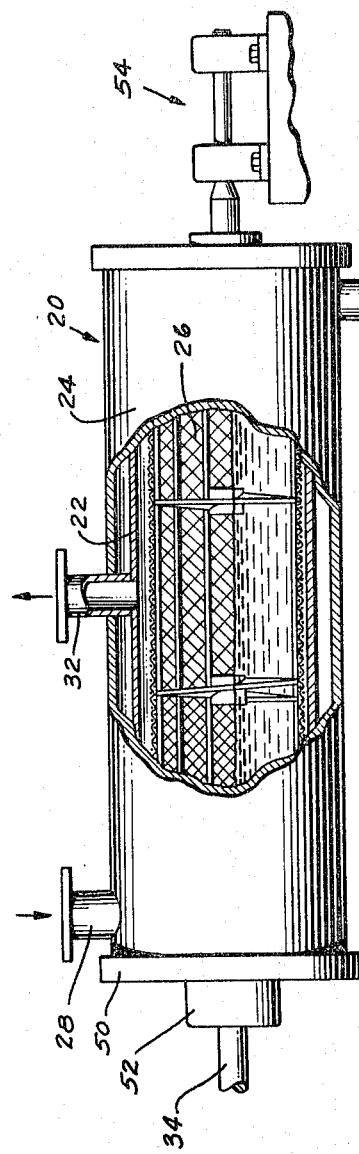
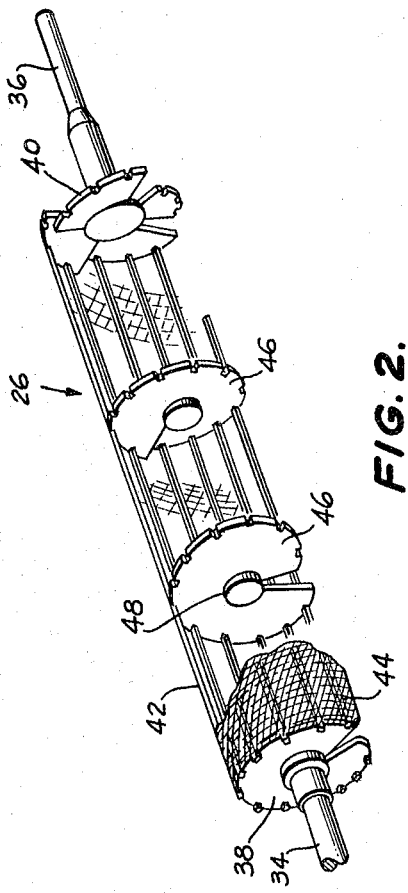
INVENTOR
FREDERICK J. HOWE
BY
*Kelly O. Corley*
ATTORNEY United States Patent Office 3,279,895
Patented Oct. 18, 1966

3,279,895
POLYMERIZATION APPARATUS
Frederick J. Howe, Pensacola, Fla., assignor to Monsanto Company, a corporation of Delaware
Filed Jan. 14, 1964, Ser. No. 337,658
6 Claims. (Cl. 23—285)

The present invention concerns continuous polymerization apparatus which is specially constructed to provide uniform retention time, controlled mixing, and excellent film formation.

One of the principal steps encountered in the production of polymeric materials by melt polymerization is the finishing step during which the polymerization reaction is carried to its completion. In continuous processes such as those used for nylon and polyethylene terepthalate, this final polymerization step is normally carried out in heated cylindrical horizontal vessels known as finishers.

It is desirable that these finishers provide substantially "compartmentalized" (flow with a minimum of mixing in the axial direction) of the polymer being treated since polymers are subject to degradation if maintained at elevated temperatures for extended periods of time. Considerable mixing of the polymer within each "compartment" is desirable in order to provide a uniform output product and to facilitate contact between reactive molecules so that the desired reaction may go forward. It is thus necessary to retain the polymer in the finisher for sufficient time to complete the reaction, but equally necessary to prevent any particular group of molecules from being retained much longer or shorter than the average retention time for all molecules.

The removal of gaseous or vaporous reaction products from high viscosity melts is usually difficult to achieve in a reasonable length of time. Such removal is greatly facilitated by forming the polymer into a film to increase its surface area.

Prior art finishers have used both solid and perforated continuous screws for forwarding the polymer. The solid screw can generally be designed to provide substantially compartmentalized flow, but most practicable designs require operation at slow speed, such as from 1 to 3 revolutions per minute. These slow speeds produce poor mixing within the compartments and low film-forming efficiencies. Only limited improvement can be realized with perforated screw flights, because if the perforations are sufficiently large to reduce the pumping efficiency and allow higher screw speeds with consequent improvement in mixing within each compartment, backward and forward mixnig through the perforations between adjacent compartments becomes objectionable.

An alternative approach involves the use of discontinuous screws containing solid and/or perforated discs, screw flight segments, and the like. This permits the use of higher screw speeds but the characteristic flow patterns created by this arrangement generate objectionable back and forward mixing. Thus this approach likewise causes the residence time of many molecules to deviate substantially from the average, and satisfactory compartmentalized flow is not realized.

By a recent invention of J. E. Tate and G. L. Whitesell, disclosed in a U.S. patent application filed concurrently herewith and identified as Serial No. 337,608, filed January 14, 1964, these disadvantages of the prior art are overcome by constructing the polymer-forwarding apparatus in the form of a radially perforated horizontal rotating cylinder, through which the polymer flows axially. According to the present invention, the perforated member forming the cylinder is oriented so as to impart substantially greater torsional rigidity to the cylinder, as will be more fully explained below.

Accordingly, a primary object of the invention is to provide a shaftless polymerization apparatus having increased rigidity.

A further object is to provide polymerization apparatus of the above character which produces excellent mixing of molecules having the same residence times.

A further object is to provide polymerization apparatus of the above character which has excellent film formation properties, thus providing for efficient removal of the gaseous reaction products.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIGURE 1 is a side elevation view partly broken away, of an exemplary polymerization apparatus according to the present invention; and FIGURE 2 is a schematic perspective view, partially broken away, of the polymer handling apparatus.

Referring now generally to FIGURE 1, there is illustrated a finisher 20 of the general type disclosed in the Tate et al. application 337,608, wherein the perforated member is oriented according to the present invention. Finisher 20 comprises a general cylindrical finishing chamber 22 surrounded by a heating jacket 24, and includes a novel polymer handling and conveying assembly 26 disposed within chamber 22. Partially polymerized material of low molecular weight is fed into the left end of chamber 22 as viewed in FIGURE 1 through an input supply line 28, while the finished high molecular weight polymer is removed through an output line 30 at the right end of chamber 22 as viewed in FIGURE 1. An exhaust line 32 communicates with the upper portion of chamber 22 in order to remove the gaseous reaction products.

The novel polymer handling and conveying assembly 26 is best illustrated in FIGURE 2, to which reference is now made. A pair of stub shafts 34 and 36 are aligned on the axis of assembly 26, and support the remainder of the generally cage-like assembly 26. Stub shafts 34 and 36 have rigidly mounted on their opposed ends screw segments or flights 38 and 40, respectively. A plurality of horizontal rods 42 connect flights 38 and 40, to form a generally cylindrical frame. Rods 42 may be welded into mating notches in the periphery of flights 38 and 40, and should be parallel to the axis of shafts 34 and 36. An annular radially-perforated cylindrical member 44, illustrated in the form of a wire mesh, is mounted on the periphery of flights 38 and 40, and is preferably welded to and supported by the several rods 42. Additional flights 46 may be added to assembly 26 as necessary. Short cores 48 may be welded to the centers of flights 46 to provide stiffness. Preferably these additional flights have their peripheries notched to mate with the several rods 42, and are welded in place.

Mesh 44 should have perforations or apertures there-through having minimum dimensions no less than ⅛ inch and no greater than 1½ inch. The optimum minimum dimension is about ½ inch. Advantageously, as illustrated, the dimensions of the apertures may increase toward the end where the polymer is most viscous, i.e., the apertures nearest shaft 36 may be larger than those near shaft 34. This increase in aperture size may be simply provided by removing selected segments of the wire mesh.

A major feature of assembly 26 is the absence of a conventional central shaft, which would normally be integral with stub shafts 34 and 36. When a central shaft is used, the viscous polymer tends to adhere to and rotate with the shaft, causing irregular flow and substantial deviations from the desired uniform residence times. The assembly 26 according to the Tate et al. invention replaces such a central shaft with the two stub shafts which support the remainder of the cage-like assembly.

According to the present invention, wire mesh 44 is applied to the framework with each individual wire thereof arranged in a helix about the framework, rather than with some of the wires running parallel to the axis of assembly 26 and the remainder forming circles about the framework. Each intersection of each wire with the several rods 42 or the flights 38, 40, or 46, is preferably welded to impart the maximum degree of rigidity to the assembly. Maximum rigidity is produced when the helix angle formed by one set of the wires is between 30° and 60°, although some increase in rigidity is produced by any angle greater than zero. A helix angle of 45° is convenient and is preferred. When the mesh is oriented according to the present invention, it lends substantial torsional rigidity to assembly 26, to compensate for the absence of a continuous central support shaft. This added torsional rigidity is particularly significant when only one of stub shafts 34 and 36 is driven.

Assembly 26 is installed in chamber 22, the lower surface of which should fairly closely conform to the cylindrical shape of the perforated cylinder formed by mesh 44. Stub shaft 34 extends through the intake end wall 50 of chamber 22 through a suitable seal and bearing assembly 52, while stub shaft 36 is journalled in another bearing 54 near outlet line 30. Shaft 34 is driven by a suitable motor (not illustrated) which may be of any desired type. For optimum operation, the polymer level in chamber 22 should be approximately along the axis of assembly 26, although satisfactory operation is maintained if the level is within about ⅙ the diameter of assembly 26 above or below this level.

In the operation of the apparatus as thus described, the relatively low molecular weight polymer fed through line 28 (see FIGURE 1) is conveyed by assembly 26 slowly through chamber 22 until it is finally discharged through line 30 as a high molecular weight polymer. As the polymer passes through chamber 22, most of the polymer will be contained within the cylinder defined by mesh 44. As assembly 26 is rotated by shaft 34, polymer will bridge the apertures between adjacent strands of the wire mesh and will be carried up until it falls from the mesh and back into the interior of assembly 26. The polymer in so falling away from the wires constituting the mesh will form films resembling rectangular honeycombs and having a great surface area. This facilitates greatly removal of the reaction gaseous by-products, thus promoting the polymerization reaction.

It should be particularly noted that since the mesh moves in a circular path with its wall parallel to the direction of polymer flow, there are essentially no forces which tend to mix portions of the polymer which have been in chamber 22 for different times (i.e., there is essentially no mixing in a direction parallel to the axis of assembly 26), while there is very effective mixing of polymer in all planes perpendicular to the axis of cylinder 26 as well as formation of films having greatly increased surface area.

As an example of a finisher particularly adapted for rapid polymerization of polyethylene terephthalate, assembly 26 had approximately a 7½ inch diameter, with about ⅛ inch clearance between its lower half and the wall of chamber 22. Approximately two inches clearance was provided between the top of assembly 26 and chamber 22. Flights 38 and 40 were about nine feet apart with intermediate flights 46 at one foot intervals, although a lesser number of intermediate flights could be used if desired. Each flight had a one inch pitch, except flight 40, which was in the form of a four-bladed propeller with a four inch pitch. The three feet of mesh nearest flight 38 was formed of ½ x ½ inch wire cloth, the central three feet was formed ½ x 1 inch wire cloth (formed by removing portions of ½ x ½ inch wire cloth), while the three feet nearest flight 40 was formed of 1 x 1 inch wire cloth. Assembly 26 was rotated at between about three and eleven r.p.m., providing excellent radial mixing and rapid polymerization due to the large film surface area created, together with a minimum of mixing of polymer in the axial direction. It is to be understood that these specific parameters are merely illustrative and are not critical to the invention.

It may be seen from the above description and the accompanying drawings that the cage assembly 26 according to the present invention provides substantially increased torsional rigidity as compared to similar constructions wherein the wires or other filamentary members are not disposed helically on the cage periphery. When the helix angle is selected to be within the preferred range indicated above, maximum rigidity of the cage assembly is provided. This feature is especially significant when the cage assembly 26 is driven only from one end, and when it is of shaftless construction. The apparatus as disclosed is simple and efficient, and is well adapted for use in polymerizing various polymers such as nylon or polyethylene terephthalate.

I claim:
1. A shaftless cage assembly for handling and conveying polymer material in a polymer finisher, said cage assembly comprising, in combination:
   (a) a plurality of spaced axially aligned flights for axially conveying said polymer material,
   (b) a plurality of substantially circumferentially arranged spaced rods connecting said flights and forming therewith an elongated cylindrical frame,
   (c) a plurality of elongated filamentary members helically wound in a first direction on and secured to said frame,
   (d) and support members secured at each end of said elongated cylindrical frame to support and rotatably drive the latter.

2. The shaftless cage assembly defined in claim 1 wherein said filamentary members form a helical angle of between 30° and 60°.

3. The shaftless cage assembly defined in claim 1 wherein said filamentary members form a helical angle of about 45°.

4. A shaftless cage assembly for handling and conveying polymer material in a polymer finisher, said cage assembly comprising, in combination:
   (a) a plurality of spaced axially aligned flights for axially conveying said polymer material,
   (b) a plurality of substantially circumferentially arranged spaced rods connecting said flights and forming therewith an elongated cylindrical frame,
   (c) a first plurality of elongated filamentary members helically wound in a first direction on and secured to said frame,
   (d) a second plurality of elongated filamentary members oppositely helically wound on and secured to said frame, whereby said first and said second pluralities of filamentary members form an open mesh cylindrical cage,
   (e) and support members secured at each end of said elongated cylindrical frame to support and rotatably drive the latter.

5. The shaftless cage assembly defined in claim 4 wherein at least one of said pluralities of filamentary members forms helical angles of between 30° and 60°.

6. The shaftless cage assembly defined in claim 5 wherein at least one of said pluralities of filamentary members forms a helical angle of about 45°.

References Cited by the Examiner
UNITED STATES PATENTS 3,046,099　7/1962　Willey _____ 23—285

MORRIS O. WOLK, *Primary Examiner.*

JAMES H. TAYMAN, Jr., *Assistant Examiner.*